US012679016B2

(12) United States Patent
Del-Hoyo et al.

(10) Patent No.: US 12,679,016 B2
(45) Date of Patent: Jul. 14, 2026

(54) EXTRUSION FACILITY WITH UNDERGROUND TRANSFER OF THE TOOL MODULE

(71) Applicant: COMPAGNIE GENERALE DES ETABLISSEMENTS MICHELIN, Clermont-Ferrand (FR)

(72) Inventors: Fabien Del-Hoyo, Clermont-Ferrand (FR); Thomas Babin, Clermont-Ferrand (FR); Herve Tirot, Clermont-Ferrand (FR); Pablo Le-Bihan, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 461 days.

(21) Appl. No.: 18/269,336

(22) PCT Filed: Oct. 22, 2021

(86) PCT No.: PCT/FR2021/051855
§ 371 (c)(1),
(2) Date: Jun. 23, 2023

(87) PCT Pub. No.: WO2022/136746
PCT Pub. Date: Jun. 30, 2022

(65) Prior Publication Data
US 2025/0073976 A1     Mar. 6, 2025

(30) Foreign Application Priority Data
Dec. 23, 2020    (FR) ...................................... 2014011

(51) Int. Cl.
B29C 48/025        (2019.01)
B29C 48/25        (2019.01)
(Continued)

(52) U.S. Cl.
CPC ........ B29C 48/025 (2019.02); B29C 48/2562 (2019.02); B29C 48/2566 (2019.02); (Continued)

(58) Field of Classification Search
CPC ....... B29C 48/025; B29C 48/07; B29C 48/18; B29C 48/19; B29C 48/21; B29C 48/2562; (Continued)

(56) References Cited

U.S. PATENT DOCUMENTS 6,695,606 B1 *    2/2004    Burg ....................... B29C 48/35
                                                              425/464
11,485,047 B2    11/2022    Ougier et al.
(Continued)

FOREIGN PATENT DOCUMENTS

JP          2005-254464 A      9/2005
WO        2018/115796 A1      6/2018

OTHER PUBLICATIONS

International Search Report dated Feb. 3, 2022, in corresponding PCT/FR2021/051855 (4 pages).

*Primary Examiner* — Xiao S Zhao
*Assistant Examiner* — Joseph S Leyson
(74) *Attorney, Agent, or Firm* — VENABLE LLP

(57) ABSTRACT

An extrusion facility comprises a core site (5) designed to receive a tool module (6) in order to connect an extruder (4) to it with a view to producing a profiled element (2), the core site (5) being located at a first level (11), referred to as "working level" (11), which is provided with a floor (12) on which an operator can move about to access the core site (5), and an underground-transfer device (30) which makes it possible to convey the tool module (6) to the core site (5) and, respectively, to remove the tool module (6) from the core site (5), from and to, respectively, a remote preparation site (40) by using a lift cage (31, 41) to move the tool module
(Continued)

(6) through the floor (12) from, or respectively to, a second level (32), referred to as "basement" (32), which is located below the floor (12).

11 Claims, 9 Drawing Sheets

(51) Int. Cl.
    *B29C 48/27*           (2019.01)
    *B29C 48/35*           (2019.01)

(52) U.S. Cl.
    CPC ........ *B29C 48/266* (2019.02); *B29C 48/2665* (2019.02); *B29C 48/2715* (2019.02); *B29C 48/272* (2019.02); *B29C 48/35* (2019.02)

(58) Field of Classification Search
    CPC . B29C 48/2566; B29C 48/265; B29C 48/266; B29C 48/2665; B29C 48/2715; B29C 48/272; B29C 48/35; B29C 48/49; B29C 48/495
    See application file for complete search history.

(56)            References Cited

U.S. PATENT DOCUMENTS

| | | |
|---|---|---|
| 2019/0308361 A1 | 10/2019 | Ougier et al. |
| 2022/0032525 A1* | 2/2022 | Ougier .................. B29C 48/142 |

* cited by examiner

EXTRUSION FACILITY WITH UNDERGROUND TRANSFER OF THE TOOL MODULE

BACKGROUND

The present invention relates to the field of extrusion facilities, and in particular extrusion facilities intended to produce profiled elements from one or more rubber compounds.

Such profiled elements can notably be intended for the manufacture of pneumatic tyres.

In a manner known per se, extrusion facilities can comprise multiple extruders, which are attached to a tool which makes it possible to bring together and arrange the various compounds coming from the said extruders and which has a die for shaping the profiled element. It is thus advantageously possible to obtain relatively complex profiled elements by coextrusion of multiple compounds.

However, the multiplicity of extruders within one and the same facility, and the massive nature of the tool, which specifically must be robust enough with respect to the considerable pressure stresses generated during the extrusion of rubber compounds, lead to the production of facilities which are relatively bulky and, especially, some parts of which are very remote from one another and/or sometimes difficult to access.

This complicates the management of the facility, notably when it is necessary to resupply the extruders during the extrusion operation, in order to ensure the continuous supply of rubber compound, or when it is necessary to clean the tool and/or the extruders after the extrusion operation in order to restart production.

As a result, it is not rare, notably, to need to mobilize multiple operators to operate and/or clean one and the same extrusion facility, each operator being assigned to a separate station within the extrusion facility.

Moreover, the operations necessary to reconfigure the facility, and more particularly to change the tool, in order to transfer from the production of a first type of profiled element to the production of a second type of profiled element different from the first, are often complex and awkward, and therefore take a relatively long time, all the more so if the masses employed during the displacements of the extruders and/or the tool are particularly high, this requiring a lot of vigilance by the operators to ensure that the said displacements take place in complete safety.

Because of this, the known extrusion facilities are often not very flexible, in that they are not well adapted to rapid changes in production even through there is an increasing demand for diversification of productions, aiming to produce small series of profiled elements each having very specific and varied features, in order notably to manufacture small series of the corresponding specific tyres, this requiring ever more frequent changes in production.

SUMMARY

The subjects of the invention consequently aim to overcome the aforementioned drawbacks and propose an extrusion facility which has good compactness, great ease of use, and an excellent capacity for rapid reconfiguration in complete safety during changes in production.

The subjects of the invention are reached by means of an extrusion facility intended to produce a profiled element, the said facility comprising at least one first head module which bears at least one first extruder intended to supply a constituent material of the profiled element, the said facility also comprising a site, referred to as "core site", which is designed to receive a tool module in order to enable the connection of the said at least one first extruder to the said tool module in order to shape the profiled element, the said facility being characterized in that the core site is located at a first level, referred to as "working level", which is provided with a floor on which an operator can move about to access the said core site which is located above the said floor, and in that the said facility comprises an underground-transfer device which makes it possible to convey the tool module to the core site and/or, respectively, to remove the tool module from the said core site, the said underground-transfer device to that end comprising at least one first lift cage which is designed to move the said tool module through the floor from, or respectively to, a second level, referred to as "basement", which is located below the floor of the working level.

Advantageously, by providing removal, and more generally conveyance, of the tool module through the basement, the facility according to the invention makes it possible to clear and preserve a maximum amount of free space on the floor at the working level for the other components of the facility, notably for the extruders, which can thus be installed at the said working level, on one and the same floor level, and also distributed on the said floor in multiple directions in relation to the core site, such that the said components of the facility for the one part occupy a relatively modest overall surface area on the ground, and so the facility is relatively compact, and for the other part remain easily accessible to one and the same operator moving about on the floor.

Similarly, as will be seen in detail below, the implementation of an underground-transfer device according to the invention makes it possible to connect the core site to a remote preparation site which is intended for the cleaning and preparation of the tool modules and is advantageously offset in relation to the core site whilst still remaining accessible to an operator moving about on the working level.

As a result, advantageously, one and the same operator, by remaining on one and the same level, specifically on the floor of the working level, can operate the facility during a profiled element production cycle, all the while having available all the space necessary for them in the immediate vicinity of the core site and the extruders, and, in a parallel operation, that is to say during which the extrusion operation takes place, can clean and prepare a new tool module at the preparation site located nearby, in the process anticipating the next production cycle, and then, by virtue of the underground-transfer device according to the invention, can rapidly exchange the used tool module for the new tool module, when the time comes to change the production. It is thus possible to significantly reduce the downtime of the facility between two successive production cycles.

It will be noted moreover that, inasmuch as the transfer of the tool modules takes place underground, the said transfer is made perfectly safe since the path of the tool module never crosses the one or more routes taken by the operator as he moves about on the floor within the working level.

BRIEF DESCRIPTION OF THE FIGURES

Further subjects, features and advantages of the invention will become apparent in more detail from reading the following description and with the aid of the appended drawings, which are provided purely by way of nonlimiting illustration, in which.

DETAILED DESCRIPTION

The present invention relates to an extrusion facility 1 intended to produce a profiled element 2.

Figure 1:
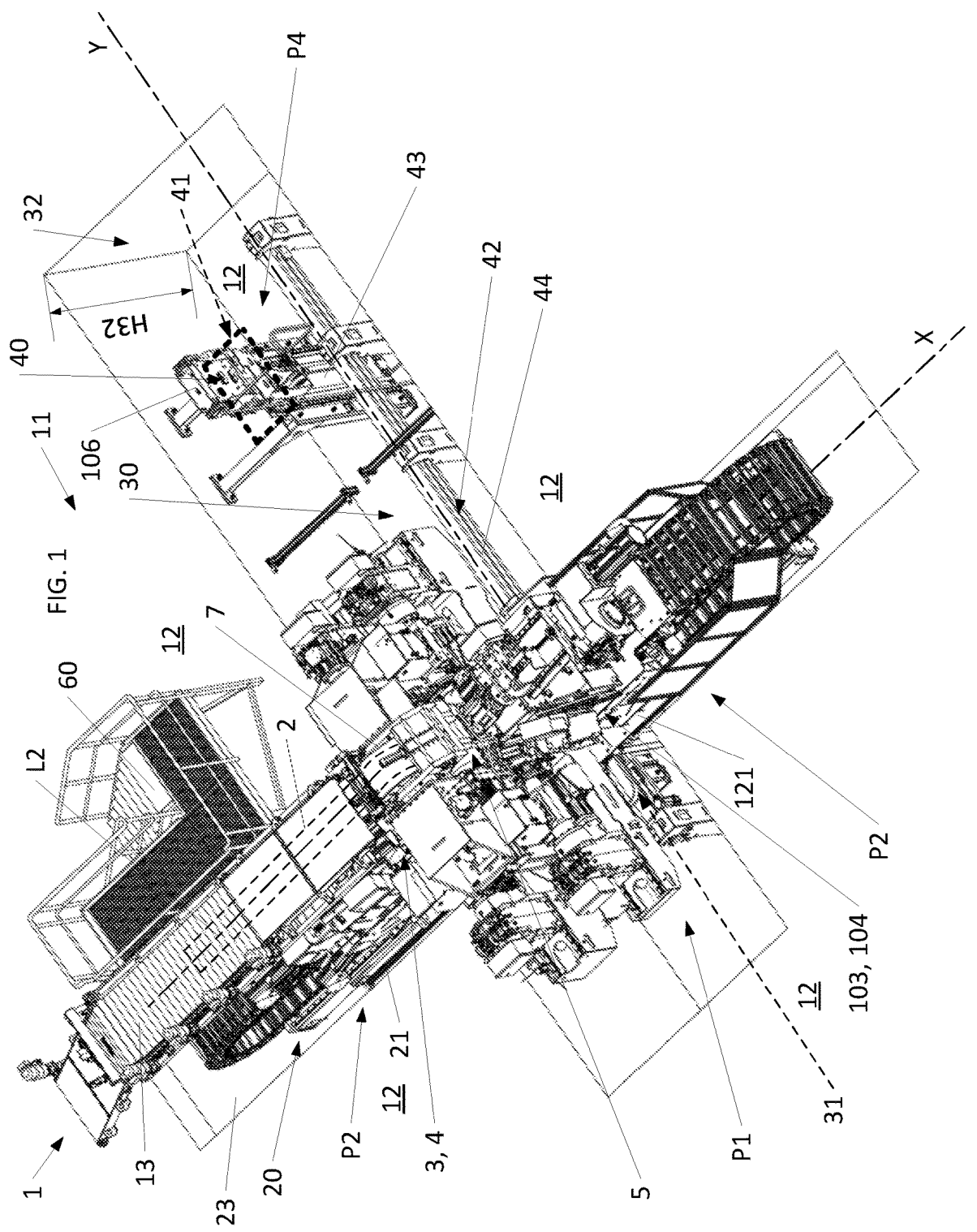
FIG. 1 illustrates an overall perspective view of an exemplary facility according to the invention.
Figure 3:
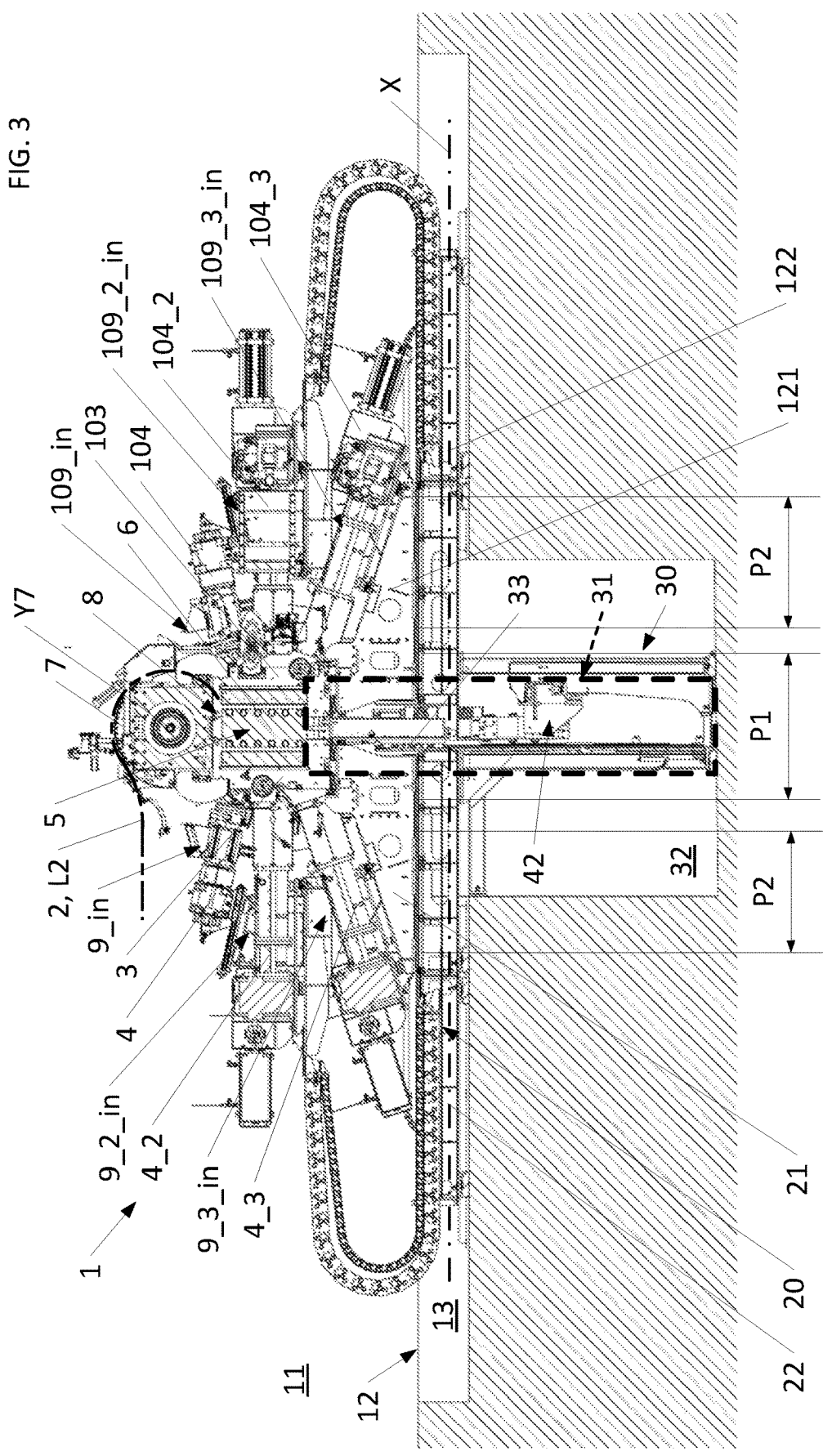
FIG. 3 illustrates the facility of FIGS. 1 and 2 in a closed configuration, in a sectional front view showing the working level and the basement at the same time.
Figure 4:
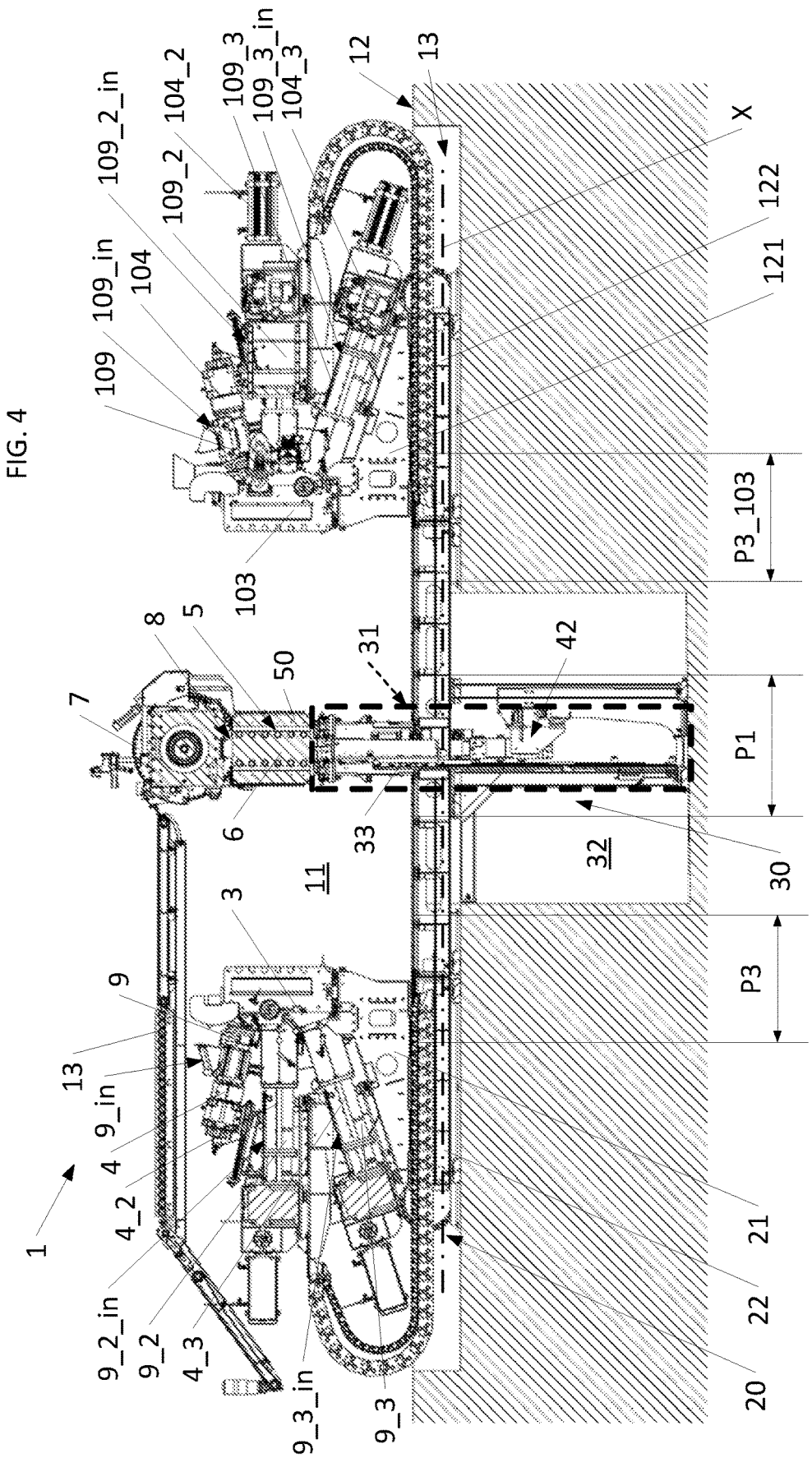
FIG. 4 illustrates the facility of FIGS. 1, 2 and 3 in the open configuration, in a sectional front view in the same sectional plane as FIG. 4.

As can be seen notably in FIGS. 1, 3 and 4, the said facility 1 comprises at least one first head module 3 which bears at least one first extruder 4 intended to supply a constituent material of the profiled element 2.

The said constituent material of the profiled element, or "compound", is preferably based on rubber.

The facility 1 also comprises a site 5, referred to as "core site" 5, which is designed to receive a tool module 6 in order to enable the connection of the said at least one first extruder 4 to the said tool module 6 in order to shape the profiled element 2.

As a result, the core site 5 will correspond, by convention, to that region of space that is taken up by the tool module 6 when the said tool module 6 is in use, during a cycle for producing the profiled element 2, and when the said tool module 6 has been moved close to the first extruder 4 (and where appropriate, if the facility has multiple extruders 4, 104, 4_2, 4_3, 104_2, 104_3, to various extruders of the said facility) to that end.

Preferably, the facility 1 comprises a roller 7 which is mounted so as to be able to rotate opposite the core site 5, such that when the tool module 6 is located at the core site 5, the said tool module 6 interacts with the said roller 7 to, as can be seen in FIG. 3, form a gap 8 which makes it possible to shape the profiled element 2, and more particularly defines the thickness of the said profiled element 2.

The said roller 7, which is preferably metallic, for example made of steel, is preferably motorized and driven in rotation on itself around its central axis Y7 in order to accompany the longitudinal progression of the profiled element 2 as the said profiled element 2 is generated in the gap 8. The roller 7 preferably has a diameter lying between 15 cm and 300 cm, more preferably between 90 cm and 300 cm.

The said roller 7 advantageously serves for the one part to delimit the gap 8, which corresponds to the space comprised, radially in relation to the central axis Y7 of the roller 7, between the radially outer surface of the said roller 7 and that end face of the tool module 6 that is opposite the said roller 7 and covers a predetermined angular sector around the central axis Y7, and for the other part to enable the cooling and dimensional stabilization of the profiled element 2 after the said profiled element 2 has left the gap 8.

The central axis Y7 of the roller 7 is preferably oriented horizontally, notably for reasons of compactness and mechanical stability of the extrusion process.

In a manner known per se, the first extruder 4 preferably comprises a screw which is driven in rotation about its longitudinal axis in a barrel 9, which barrel 9 is secured to the first head module 3.

The barrel 9 is preferably provided, in an upstream portion, with a feed zone 9_in comprising an inlet orifice, for example in the form of a hopper, for introducing the material to be worked, for example in the form of rubber fragments or a continuous rubber strip, into the barrel 9 and, in a downstream portion, with an outlet orifice which allows the material worked (kneaded and heated) by the screw of the extruder to leave the said barrel 9.

The first head module 3 is arranged so as to be able to place the outlet orifice of the barrel 9 in communication, in a sealed flow circuit, with one or more corresponding channels 10 made in the tool module 6 (FIGS. 14, 15, 16), in order to be able to convey the material, extruded by the extruder 4, to the gap 8 via the said one or more channels 10 and then by way of the said tool module 6.

In one possible application, the profiled element 2 could be formed of a single layer of just one homogeneous material based on rubber.

In another possible application, the profiled element 2 will preferably be made from multiple materials of different compositions, based on rubber.

To that end, the facility 1 will comprise preferably a plurality of extruders 4, 4_2, 4_3, 104, 104_2, 104_3 ( . . . ) such that the said multiple materials based on rubber are each worked by at least one dedicated extruder among the said plurality of extruders, and then conveyed through the tool module 6 and lastly brought together, arranged and shaped to form a profiled element 2, according to a desired layout.

Several of the said extruders, and preferably all of the extruders 4, 4_2, 4_3, 104, 104_2, 104_3 ( . . . ), could be screw extruders, and will each preferably comprise their barrel 9, 9_2, 9_3, 109, 109_2, 109_3 ( . . . ), each exhibiting a feed zone 9_in, 9_2_in, 9_3_in, 109_in, 109_2_in, 109_3_in ( . . . ).

The compositions of the various materials which are juxtaposed in the straight cross section of the profiled element 2, and the positions and the dimensions of the locations of the said materials in the straight cross section of the profiled element, will of course be predefined depending on the destination of the said profiled element 2.

In this regard, it will be noted that the said profiled element 2 is preferably intended to form a constituent part of a pneumatic tyre, for example a tread, a sidewall, or even, notably if the said profiled element is formed of a single, particularly thin material, a liner layer intended to form an interface between two layers superposed within the pneumatic tyre.

The profiled element 2 is advantageously produced continuously in the sense of its length, which defines a direction referred to as "longitudinal direction" L2.

According to the invention, the core site 5 is located at a first level 11, referred to as "working level" 11, which is provided with a floor 12 on which an operator can move about to access the said core site 5, which is located above the said floor 12.

The floor 12 will advantageously form a load-bearing surface on which an adult human operator can stand and move about.

To that end, the said floor 12 could be solid, for example made of concrete or metal, and/or possibly apertured, for example with incorporation of walkways of the metal grid type.

The expression "above the floor" means that the object in question is located in that region of space that is located vertically on the side of the upper face of the floor 12, and thus at an elevation greater than the elevation of the said upper face of the said floor 12.

The floor 12 preferably makes up a surface which is fixed, that is to say immovable, in relation to the installation frame of reference of the facility 1.

The floor 12 preferably forms a flat surface.

Although it is not ruled out that the floor 12, notably in places, has a certain inclination preferably less than 10 degrees, less than 6 degrees, or even less than 3 degrees in relation to the horizontal, the said floor 12 will preferably form a horizontal surface.

In order to provide enough vertical clearance to allow the operator to stand, but also to enable the integration and operation of the roller 7 and, where appropriate, the discharge of the profiled element 2 by a discharge belt 13 placed at the outlet of the roller 7, the free height of the working level 11 above the floor 12 will preferably be equal to or greater than 2.00 m, preferably equal to or greater than 2.50 m, or even equal to or greater than 3.00 m. By way of indication, the said free height could be equal to 2.80 m, where appropriate+/−20 cm.

The floor 12 comprises a first station P1, also referred to as "core station P1", which faces the core site 5 at a distance less than 1 m, preferably less than 50 cm (thus within arm's reach), from the closest limit of the said core site 5, so as to serve the core site 5.

Advantageously, when the operator occupies the said first station P1, they will be able to visually monitor the said core site 5 during the production and/or make physical interventions within the said core site 5, and, where appropriate, at the roller 7.

By convention, the reference elevation of the floor 12 is considered to be the elevation of the floor 12 at the level of the first station P1, that is to say substantially at the level of the core site 5.

Preferably, the core site 5, and consequently the tool module 6 that is in use, is located within an elevation range of between 0 cm and 200 cm, preferably between 30 cm and 180 cm, above the floor 12 of the working level 11.

As a result, advantageously, the core site 5 will be located at "human height" in relation to the floor 12 surrounding it, such that the first station P1 will provide the operator with a certain amount of comfort and good ergonomics for interventions in and at the surroundings of the core site 5.

Advantageously, the floor 12 extends around the facility 1, and notably around the extruders 4, 4_2, 4_3, 104, 104_2, 104_3 so as to be able to serve, in addition to the first station P1, other stations P2, P3, P4, which will be described in detail below, including one feed station or second feed stations P2 allowing the operator to monitor and make interventions at the level of the one or more feed zones 9_in of the one or more respective barrels 9, 9_2, 9_3, 109, 109_2, 109_3 of the one or more extruders 4, 4_2, 4_3, 104, 104_2, 104_3, one or more third stations P3, P3_103 for cleaning the one or more head modules 3, 103 when the facility 1 is in the open configuration after an extrusion cycle, and at least one preparation station P4 for preparing and cleaning a tool module 6, 106 in a parallel operation.

As a result, in particular, the first extruder 4 preferably has a feed zone 9_in which is located above the floor 12 and is accessible to the operator from a second station P2 formed by a portion of the floor 12 of the working level 11, that is to say of the same floor 21 as that of the first post P1 serving the core site 5.

In this regard, the said feed zone 9_in is preferably located at human height, that is to say in an elevation range of between 0 cm and 200 cm, preferably between 30 cm and 180 cm, above the said floor 12 of the working level 11, and more particularly above the elevation of the said floor 12 at the level of the second station P2. From this second station P2, the operator can thus visually monitor and, where appropriate, make manual interventions on the feed of material to be extruded to the first extruder 4, in order notably to ensure the resupply of material to the first extruder 4 as the said material is consumed to produce the profiled element 2.

More generally, the facility 1 comprises multiple extruders 4, 4_2, 4_3, 104, 104_2, 104_3 contributing to feeding the tool module 6, and the respective feed zones 9_in, 9_2_in, 9_3_in, 109_in, 109_2_in, 109_3_in of several of the said extruders, and preferably of all the extruders 4, 4_2, 4_3, 104, 104_2, 104_3 of the facility, are located above the floor 12, more preferably in an elevation range of between 0 cm and 200 cm, or even between 30 cm and 180 cm, so that they are all accessible to an operator who is on the said floor 12, at the working level 11.

As a result, the operator, without leaving the floor 12 and thus without having to change elevation level, can easily move to different feed stations P2, from or via the core station P1, in order to monitor the feed zones of the different extruders and, if required, to make interventions, for example to resupply the said extruders, or else to prevent jamming (clogging) or to remedy such jamming.

Furthermore, the facility 1 preferably comprises a coupling device 20 which makes it possible to displace the first head module 3 on the floor 12 of the working level 11, so as to alternately change the first head module 3 between for the one part a closed configuration, here shown notably in FIGS. 1 and 3, in which the said first head module 3 is moved close to the core site 5 so as to be pressed into contact with the tool module 6 and to thus place the first extruder 4, and, if appropriate, all the extruders 4, 4_2, 4_3 borne by the said first head module 3, in communication with the said tool module 6, and for the other part an open configuration, here illustrated in FIG. 4, in which the first head module 3 is moved away from the core site 5 and thus from the tool module 6 whilst remaining accessible to an operator who is on the floor 12, at the working level 11.

Advantageously, the one or more extruders 4, 4_2, 4_3 borne by the first head module 3, and more preferably all the extruders of the facility, are thus displaced whilst staying at the working level 11, and therefore remain accessible to the operator from the floor 12 both in the closed configuration, during a production cycle, and in the open configuration, in the event of an interruption of the production with a view to a maintenance operation or a change in production.

In particular, in the open configuration, the operator, from the floor 12 and more particularly from a portion of the said floor 12 that forms a third station P3, referred to as "maintenance station" P3, can thus advantageously make interventions on the first head module 3 and/or the extruders 4, 4_2, 4_3 borne by the first head module, and in particular clean any residues of extruded materials from the first head module 3, during changes in production, and notably during changes of the tool module 6, 106.

More particularly, the maintenance station P3 will allow the operator to access and clean the end face of the first head module 3 which, in the closed configuration, comes into contact with the tool module 6 to form a sealed joining plane, and is disengaged from the tool module and thus visible in the open configuration.

The operator can advantageously move from the first station P1 (core station), or from one of the second stations P2 (feed stations), to the third station P3 (maintenance station) whilst staying at the same working level 11, without having to leave the floor P12, and thus preferably whilst staying at a constant elevation.

The alternating movements of advancement, for bringing the first head module 3 closer to the core site 5, and then of return, for moving the first head module 3 away from the core site 5, that are performed by the coupling device 20 are carried out along a first horizontal main direction X, referred to as "coupling direction" X.

To that end, the coupling device 20 preferably has a first carriage 21 which bears the first head module 3 and is guided in rectilinear translational movement along a first rail 22 along the said coupling direction X, and thus parallel to the floor 12. The first carriage 21 may be driven by any appropriate drive member, for example by a ram, controlled by a suitable command unit.

The first rail 22 is advantageously borne by and fixed to the upper face of the floor 12.

In one arrangement possibility illustrated in FIGS. 1, 3 and 4, the rail 22 may possibly be placed in a blind recess 23 which will have been made in the thickness of the floor 12, on the side of the upper face of the said floor 12, in order to conceal and secure the rail 22 and part of the carriage 21 in relation to an operator standing on the floor 21, notably in relation to an operator standing at the first core station P1 or at the third maintenance station P3. The bottom of the recess 23 is at an elevation which is close to that of the floor 12 and thus much greater than the elevation of the ground of the basement 32, for example at least 1.75 m, preferably at least 1.90 m, or even at least 2.10 m above the ground of the basement 32. In this regard, the depth of the recess 23, considered vertically in relation to the upper face of the floor 12, will preferably be less than 50 cm, or even less than 40 cm, and could be for example between 10 cm and 50 cm, between 20 cm and 50 cm, or even between 20 cm and 40 cm.

Preferably, the facility 1 comprises, at the working level 11, a second head module 103 bearing at least one second extruder 104.

More preferably, like the first head module 3 which bears multiple extruders 4, 4_2, 4_3 ( . . . ), for example three or four extruders, the second head module 103 will bear multiple extruders 104, 104_2, 104_3, for example three or four extruders. As a result, each head module 3, 103 could, in absolute terms, simultaneously deliver multiple different constituent materials of the profiled element 2 to the tool module 6, each material originating specifically from at least one of the extruders 4, 4_2, 4_3, 104, 104_2, 104_3.

Figures 14, 15, 16:
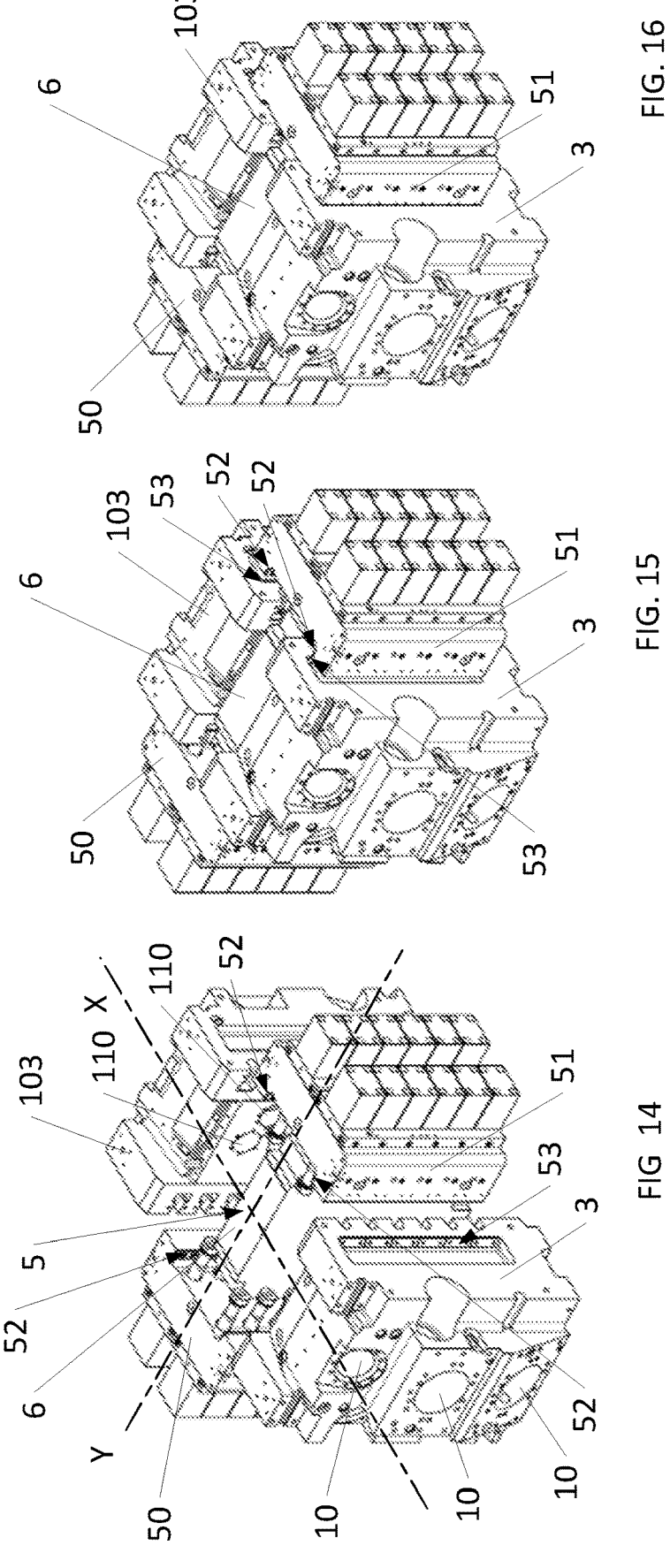
FIGS. 14, 15 and 16 illustrate perspective detail views of the successive steps for implementing a locking mechanism comprising first jaws and second jaws, each of which engages on the first head module intended to bear at least one first extruder and on a second head module intended to bear at least one second extruder, the said first and second head modules being located on either side of the core site, such that the jaws force the said first and second head modules to come together and the tool module to be clamped between the said first and second head modules.

Like the first head module 3, and as can be seen in FIG. 14, the second head module 103 will have channels 110, each receiving one of the extruders 104, 104_2, 104_3, and will be designed to be pressed into tight contact with one face of the tool module 6 in order to place each of the extruders that it bears in communication with a corresponding pathway in the said tool module 6, that is to say with a pathway served by the channel 110 in question.

In a similar way to the first head module 3, the second head module 103 will preferably be mounted so as to be able to move on a second carriage 121 guided in translational movement on a second rail 122 borne by the upper face of the floor 12, which second rail 122 is preferably rectilinear, horizontal, and aligned with the first rail 22 along the coupling direction X.

Thus, preferably, the first and the second head module 3, 103 are mounted so as to be able to move on the floor 12 along a first horizontal direction X, referred to as coupling direction X, oppositely to one another, on either side of the core site 5 so as to be able to alternately adopt for the one part an open configuration, here illustrated in FIG. 4, in which open configuration the said first and second head modules 3, 103 are each moved away from the core site 5 along the coupling direction X, so as to allow the engagement of the tool module 6 in the core site 5 or the removal of the tool module 6 from the said core site 5, and for the other part a closed configuration, here illustrated notably in FIG. 3, in which closed configuration the said first and second head modules 3, 103 are moved close to one another along the coupling direction X, so as to be held pressed against the tool module 6 located at the core site 5, on either side of the said tool module 6 along the coupling direction X, to place the first extruder 4, where appropriate the first group of extruders 4, 4_2, 4_3 that are borne by the first head module 3, and the second extruder 104, where appropriate the second group of extruders 104, 104_2, 104_3 that are borne by the second head module 103, in communication with the tool module 6.

Advantageously, to change from the closed configuration to the open configuration and vice versa, the first and second head modules 3, 103 are moved away from and close to one another alternately along a common coupling direction X and are displaced in opposite directions (that is to say counter to one another) in substantially symmetrical fashion on either side of the vertical median plane, which is normal to the coupling direction X and forms an imaginary division of the core site 5 into two symmetrical halves.

Advantageously, in the closed configuration, the tool module 6 is thus clamped very stably, in a sealed manner, between the two head modules 3, 103, here preferably in two respective joining planes which form two vertical flat surfaces normal to the coupling direction X.

Preferably, as is the case for the first head module 3, the second head module 103, when it is in the open configuration, remains above the floor 12, preferably at human height in the sense indicated above and as can be seen in FIG. 4, and so it is accessible to an operator who is on the said floor 12, at the working level 11, in the present case at a maintenance station denoted P3_103.

Thus, more particularly, in the open configuration, as is preferably also the case in the closed configuration, each of the first and second head modules 3, 103 is preferably located within an elevation range of between 0 cm and 200 cm, preferably between 30 cm and 180 cm, above the floor 12 of the working level 11, so as to be at human height for an operator when the said operator is at the maintenance station P3, P3_103.

Moreover, the tool module 6 preferably comprises an assembly of parallel plates stacked against one another in the direction of their thickness, in this case along the coupling direction X.

The various pathways for conveying the one or more materials coming from the extruders 4, 4_2, 4_3, 104, 104_2, 104_3 are advantageously made on the surface of the various plates, in the thickness of each plate in question, such that the sealed superposition of two neighbouring plates delimits the passage cross section of the pathway in question. If required, and in the present case when the tool module 6 comprises more than two superposed plates, through-ducts, here oriented along the coupling direction (X), are provided to convey the one or more compounds entering from the visible surface of the end plates towards the plates located in the deepest layers of the stack.

Such a modular and compact tool module 6 made of plates can advantageously be reconfigured easily by modifying all or some of the set of plates whilst still otherwise maintaining the arrangement of extruders and head modules 3, 103 that are intended to feed constituent materials of the profiled element to the said tool module 6.

Moreover, the effect of clamping the tool module 6 between the two head modules 3, 103 is to press the plates against one another, in the direction of their thickness, and thus contributes to the stability and leaktightness of the tool module 6.

According to the invention, the facility 1 comprises an underground-transfer device 30 which makes it possible to convey the tool module 6 to the core site 5 and/or, respectively, to remove the tool module 6 from the said core site 5, the said underground-transfer device 30 comprising to that end at least one first lift cage 31 which is designed to move the said tool module 6 through the floor 12 from, or respectively to, a second level 32, referred to as "basement" 32, which is located below the floor 12 of the working level 11.

The basement 32 extends, in relation to the floor 12, from the opposite side to the working level 11, vertically below the said working level 11, opposite the lower face of the said floor 12 and thus occupies a region of space corresponding to an elevation range strictly less than the elevation range occupied by the working level 11, and to the elevation range occupied (and filled) by the floor 12 itself, which forms a physical separation between the working level 11 and the basement 32.

Advantageously, by virtue of the arrangement at two levels 11, 32 and of the underground-transfer device 30 according to the invention, it is possible to introduce the tool module 6 into the core site 5 with a view to production, and then remove this same tool module 6 from the core site 5, passing underneath the facility 1 and passing through the floor 12, this making it possible notably to avoid the transfer device 30 taking up space at the working level 11 or the route taken by the tool module 6 during handling operations crossing the one or more routes taken by the operator on the floor 12, and more particularly the routes on the floor 12 that interconnect the various stations P1, P2, P3, P4.

This contributes to the operational safety and compactness of the facility 1.

It will be noted that, although it is conceivable, in absolute terms, that the passage through the basement afforded by the transfer device 30 can be dedicated exclusively to bringing the tool module 6 to the core site 5, or inversely exclusively to removing the tool module 6 from the core site 5, preference will be given, notably for the sake of safety, compactness and minimization of installation costs, to the transfer device 30 using the basement 32 both to bring and to remove the tool module 6.

The first lift cage 31 offers a through-opening in the thickness of the floor 12 which separates the working level 11 from the basement 12, and thus forms a well which locally interrupts the floor 12 to place the working level 11 in communication with the basement 32.

The transfer device 30, and more particularly the first lift cage 31, preferably comprises a first lift mast 33 which is designed to provide the vertical transfer, preferably in a rectilinear translational movement along the vertical direction Z, of the tool module 6 between the top of the floor 12 and the basement 32 located below the said floor 12, that is to say lowering it, and vice versa, between the basement 32 and the top of the floor 12, that is to say raising it.

By way of indication, the free height H32 in the basement, that is to say the height delimited by the ground of the basement 32 for the one part and the ceiling of the said basement which makes up the lower face of the floor 12 of the working level 11 for the other part will preferably be equal to or greater than 1.90 m, preferably between 2.00 m and 2.50 m, for example equal to 2.10 m+/−10 cm.

Such a free height H32 in the basement will advantageously be enough for the one part to enable the passage of the tool module 6, and for the other part, preferably, to allow an adult human operator to move about standing up in the said basement 32 so as to be able to inspect, and if required to make interventions on, the underground portion of the transfer device 30, that is to say that portion of the said transfer device 30 that is located in the basement 32.

The operator will preferably access the basement 32 from the floor 12 of the working level 11, and vice versa, by means of a staircase. The said staircase will comprise, for example, between 8 and 12 steps, the said steps having an individual height of between 16 cm and 22 cm.

Preferably, the roller 7 mentioned above is mounted so as to be able to rotate above the core site 5, vertically in line with the first lift cage 31.

Such a vertical staging advantageously improves the compactness of the facility 1, since it makes it possible to extrude the profiled element 2 and to discharge the said profiled element 2 on the outlet conveyor 3, from the top of the core site 5, whereas the operations of installing the tool module 6 and thus of defining the gap 8, and then the operations of removing and replacing the tool module 6, are carried out from the bottom of the said core site 5, without it being necessary to modify the position of the roller 7.

With reference to what has been described above, the facility 1 is preferably such that, in the open configuration, the first head module 3, and respectively, if need be, the second head module 103 are each moved away from the core site 5 along the coupling direction X, so as to allow the aforementioned underground-transfer device 30 to engage the tool module 6 in the core site 5 and/or to remove the tool module 6 from the said core site 5.

Furthermore, the facility 1 preferably has a preparation site 40, which is separate and remote from the core site 5, and is provided to make it possible to prepare, in particular clean, the tool module 6 outside the core site 5.

The underground-transfer device 30 is then arranged so as to be able to convey the tool module 6, by moving through the floor 12 via the first lift cage 31, from the preparation site 40 to the core site 5, and vice versa, from the core site 5 to the preparation site 40.

Advantageously, this spatial separation of the core site 5 and the preparation site 40 and the preferably motorized and preferably automatic link provided between these sites 5, 40 by the transfer device 30 make it possible to prepare a second tool module 106 in a parallel operation, while a first tool module 6 is in production, and then, during the change in production, to bring the first tool module 6 back to the preparation site 40 and to replace it, at the core site 5, with the second tool module 106, such that it is possible to clean, reconfigure or change the said first tool module 6 in a parallel operation, while the second tool module 106 is in production.

The preparation site 40 is advantageously designed to allow an operator to eliminate the residues of compounds caused by production from the tool module 6, and, where appropriate, to dismount the constituent plates of the tool module 6 to clean the said plates, and reassemble the said plates either in the same way, to make up the same tool module 6 again, or by possibly replacing all or some of the said plates with other plates, having a different arrangement of pathways, in order to reconfigure the said tool module 6 with a view to production of a different profiled element 2.

In absolute terms, there could be a preparation site 40 in the basement 32.

Figure 5:
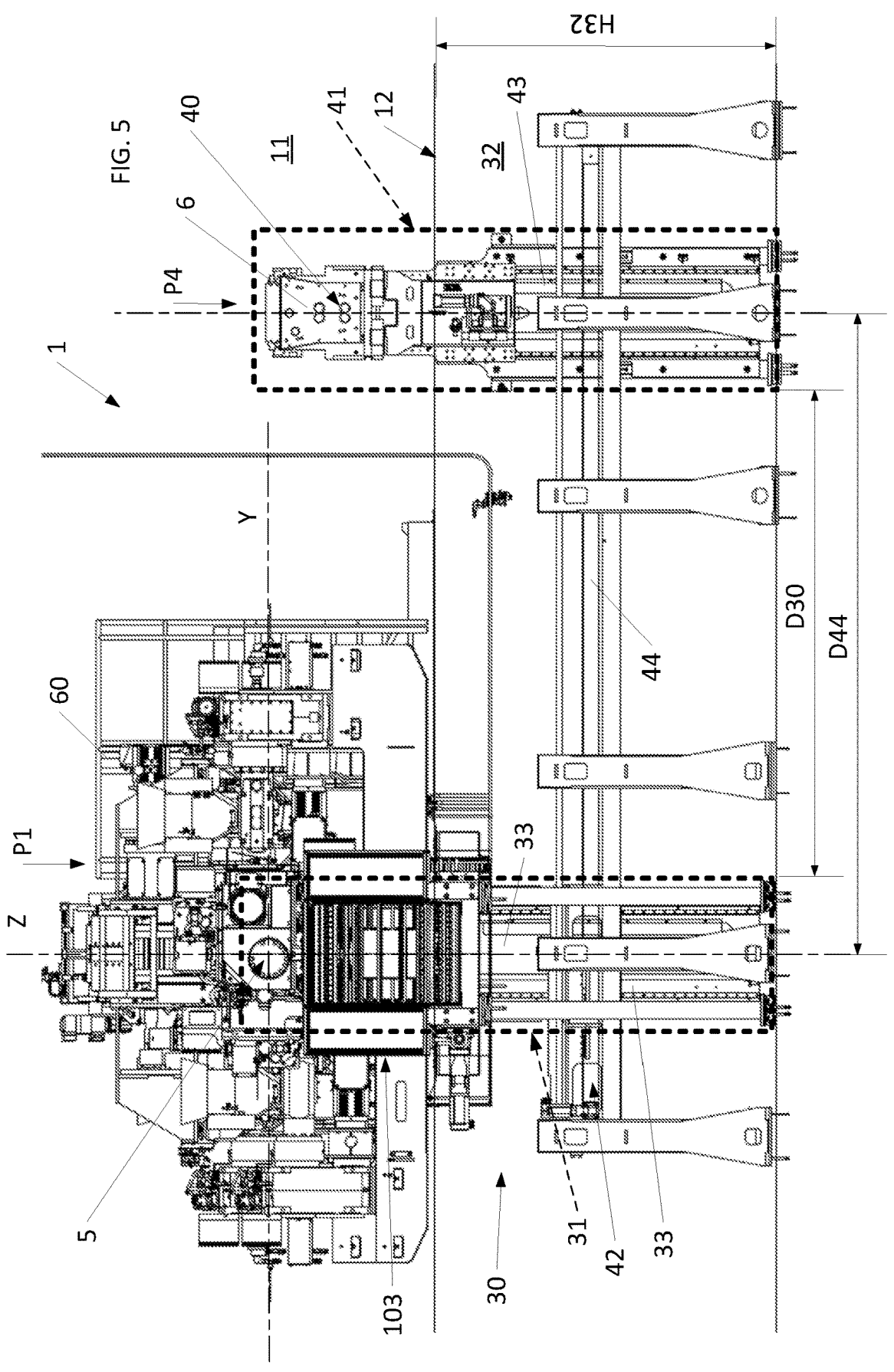
FIG. 5 illustrates the facility of FIGS. 1, 2, 3 and 4 in a sectional side view, showing the core site and a remote preparation station, both located above the floor, and the lift cages which make it possible to transfer, via a conveyor located in the basement, below the floor, the tool module from the preparation station to the core site, and vice versa.

However, preferably, and as can be seen notably in FIGS. 1 and 5, the preparation site 40 is at the working level 11, above the floor 12, and more preferably at human height (i.e., as indicated above, in an elevation range of between 0 cm and 200 cm, preferably between 30 cm and 180 cm, above the floor 12), so as to be accessible to a user moving about on the floor 12.

As a result, the floor 12 of the facility 1 will preferably comprise a fourth station P4, referred to as "preparation station" P4, from which an operator, without having to change level in relation to the core station P1 and/or in relation to one of the feed P2 and/or maintenance P3 stations, can make interventions on the tool module 6, 106 present at the preparation site 40.

To that end, the underground-transfer device 30 preferably comprises a second lift cage 41 which is located at a distance from the first lift cage 31, is connected to the first lift cage 31 by a conveyor 42 located in the basement 32, and is designed to move, and more particularly to lower, the tool module 6 through the floor 12, from the preparation site 40 located at the working level 11, above the floor 12, to the conveyor 42 located in the basement 32, below the floor 12, and, respectively, to move, and more particularly to raise, the tool module 6 from the conveyor 42 located in the basement 32, below the floor 12, to the preparation site 40 located above the floor 12.

In a similar way to the first lift cage 31, the second lift cage 31 offers a through-opening in the thickness of the floor 12 which separates the working level 11 from the basement 12, and thus forms a second well, separate and remote from the first lift cage 31, which locally places the working level 11 in communication with the basement 32.

Similarly, the transfer device 30, and more particularly the second lift cage 41, preferably comprises a second lift mast 43, here remote and separate from the first lift mast 33 present in the first lift cage 31, the said second lift mast 43 being designed to ensure the vertical transfer, within the second lift cage 41, preferably in a rectilinear translational movement along the vertical direction Z, of the tool module 6 between the basement 32 located below the floor 12 and the top of the floor 12, and vice versa.

It will be noted that, in FIG. 1, for reasons of ease of depiction, the floor 12 has been made transparent in the surroundings of the preparation site 40 so as to make the detail of the basement 32, the second lift cage 41, the conveyor 42 and the second lift mast 43 visible.

The distance D30, considered horizontally, which separates the second lift cage 41 from the first lift cage 31, referred to as "disengagement distance" D30, is of course sufficient to avoid any interference or any hindrance between the core site 5 and the preparation site 40, whilst still being small enough to limit the cost of the transfer device 30 and more generally of the facility 1. In this regard, the said disengagement distance D30 is preferably between 1.50 m and 10 m, preferably between 1.80 m and 5 m.

As can be seen notably in FIG. 5, the conveyor 42 present in the basement 32 could have a transfer rail 44 which connects the first lift cage 31 to the second lift cage 41 and on which circulates at least one receptacle 45, 46 intended to receive the tool module 6.

Preferably, the said transfer rail 44 is horizontal, to simplify the arrangement of the conveyor 42 and to limit the energy that needs to be supplied for the displacements of the receptacle 45, 46. The said transfer rail 44 is preferably rectilinear, in order to be as short as possible with regard to the disengagement distance D30 to be covered and to provide simple and stable conveyance of the receptacle 45, 46.

By way of indication, the travel D44 provided by the transfer rail 44 to pass between for the one part the vertical line through the centre of the core site 5 in the first lift cage 31 and the vertical line through the centre of the preparation station 40 in the second lift cage 41 could be between 2.00 m and 12 m, for example between 2.50 m and 6 m, or even between 3 m and 5 m.

Advantageously, transferring the tool module 6 between the preparation station 40 and the core site 5 and vice versa, via the basement 32, which the said tool module 6 enters via one of the lift cages 41, 31 and from which it then exits via the other lift cage 31, 41, after having travelled through the said basement 32, on the conveyor 42, the disengagement distance D30 which separates the said lift cages 31, 41 from one another, and more particularly after having moved through the aforementioned travel D44, advantageously makes it possible to avoid displacing the said tool module 6 within the working level 11, at the height of an operator present on the floor 12 or else passing above the operator in the form of a load suspended from a crane or a travelling crane which is vertically in line with the floor 12. By performing the transfer outside of the working level 11, underneath the said working level 11, any risk of the tool module 6 colliding with, or the tool module 6 falling on, an operator, the floor 12 or one of the components of the facility 1 present above the said floor 12 is avoided.

Preferably, the difference in elevation between the first station P1, that is to say the core station P1 allowing the operator to work at the core site 5, and the fourth station P4, that is to say the station allowing the operator to work at the preparation site 40, is less than 50 cm, preferably less than 25 cm, and more preferably zero, such that the first station P1 and the fourth station P4 are substantially or even exactly at the same elevation.

The installation of the first and fourth stations P1, P4 at one and the same working level 11, and more preferably at the same elevation, advantageously allows one and the same operator to easily manage both the production for the one part, and more particularly the closure of the head modules 3, 103 over the tool module 6 with a view to production and then starting up and monitoring the production, at the level of the core site 5, and the preparation of the tool modules 6, 106 for the other part, by moving to the preparation station 40, preferably while the production of a profiled element 2 is in progress.

In this regard, it will be noted that preferably, on the floor 12 of the working level 11, there is at least one substantially or even exactly horizontal pathway which allows an operator to travel from the first station P1 to the fourth station P4, here preferably by walking, without having to change elevation, and notably without having to take a staircase.

In a preferred arrangement, the first lift cage 31 is located below the core site 5, vertically in line with the core site 5 and the roller 7.

This simplifies the structure and improves the compactness of the facility 1 and of the first lift cage 31, and of the associated first lift mast 33.

Similarly, the second lift cage 41 is preferably located below the preparation site 40, vertically in line with the said preparation site 40.

Figure 2:
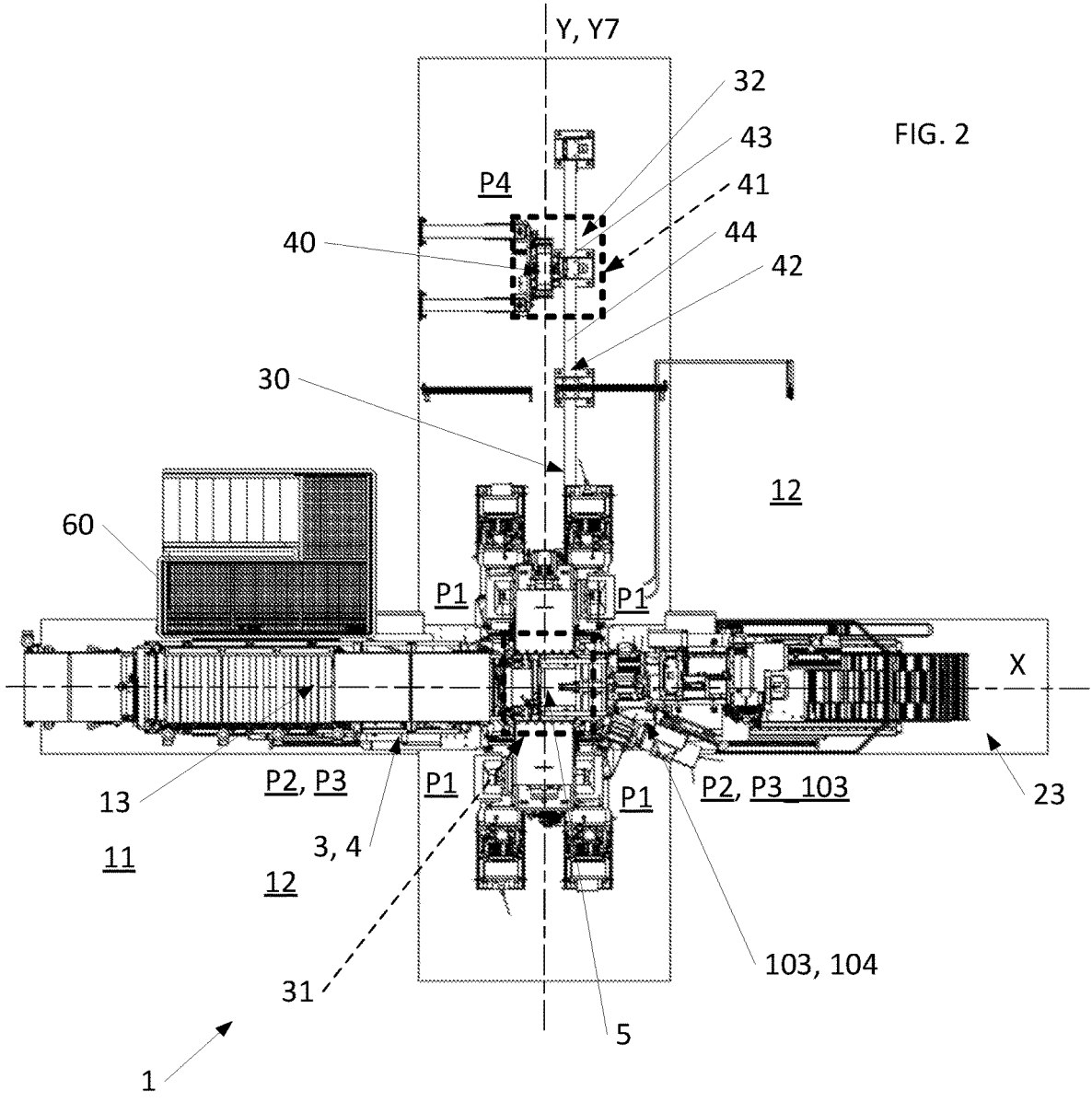
FIG. 2 illustrates a top view of the facility of FIG. 1.

As can be seen notably in FIGS. 1, 2 and 5, the said preparation site 40 and the corresponding second lift cage 41 are preferably offset in relation to the core site 5 and to the first lift cage 31 along a second horizontal direction Y which is transverse, and preferably perpendicular, to the coupling direction X, and along which the conveyor 42 placed in the basement 32 is oriented. The disengagement distance D30 is thus preferably measured along the said second horizontal direction Y.

The basement 32 thus forms an underground gallery which is covered by the floor 12 and extends along the horizontal direction Y to enable the concealed circulation, below the floor 12, of the one or more tool modules 6, 106 between the first and second lift cages 31, 41, and thus more generally between the core site 5 and the preparation site 40.

Preferably, the floor 12 of the working level 11 extends along a horizontal plane which is large enough to allow an operator who is standing on the said floor 12, without leaving the working level 11, to access by turns the core site 5, the preparation site 40, and the first and second head modules 3, 103 both when the said first and second head modules 3, 103 are in the closed configuration and when the said first and second head modules 3, 103 are in the open configuration.

In other words, on the floor 12 of the working level 11 there is at least one route serving, with a total change in elevation (change in level) of substantially zero, typically of less than 50 cm, preferably less than 25 cm, and more preferably zero, all of the stations comprising the first core station P1, the fourth preparation station P4, and at least the maintenance stations P3, P3_103 of the first and second head modules 3, 103.

Preferably, this same route also serves the feed stations P2 of the first and the second extruder 4, 104, and more preferably all the feed stations P2 of all the extruders 4, 4_2, 4_3, 104, 104_2, 104_3 of the facility 1 which are connected to the tool module via one or the other of the first and second head modules 3, 103.

As a result, preferably, the operator can advantageously access all the stations useful for managing production and changes in production without having to leave the floor 12 or even having to change elevation when they travel the route leading from one station to the other.

In a preferred implementation possibility, the underground-transfer device 30 comprises a first receptacle 45 able to receive a first tool block 6 and a second receptacle 46 able to receive a second tool block 106, as can be seen notably in FIGS. 6 to 13.

Figure 9:
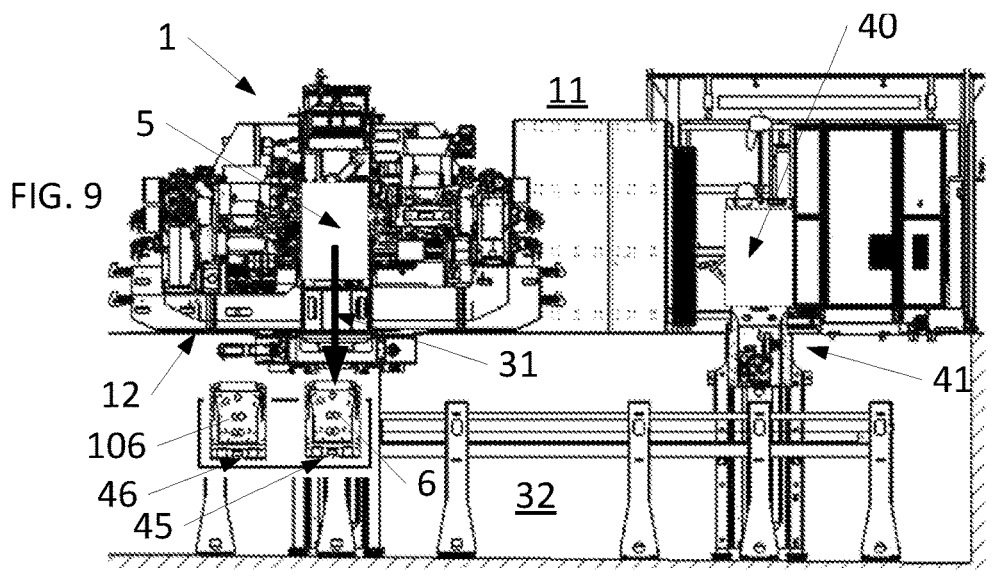
FIG. 9 illustrates a side view of the lowering, by way of the first lift cage, of the used first tool module from the core site located above the floor to the first receptacle of the conveyor which is placed in a waiting position in the basement and ensures the collection of the said first tool module, intended to be sent to the preparation site.
Figure 10:
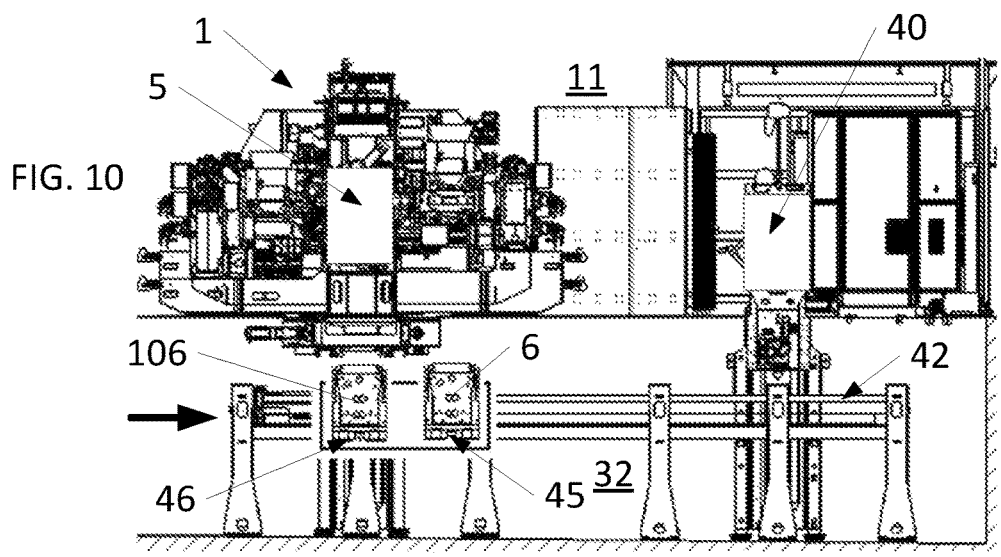
FIG. 10 illustrates a side view of the positioning of the second receptacle of the conveyor, and thus of the second tool module it contains, opposite the first lift cage.
Figure 11:
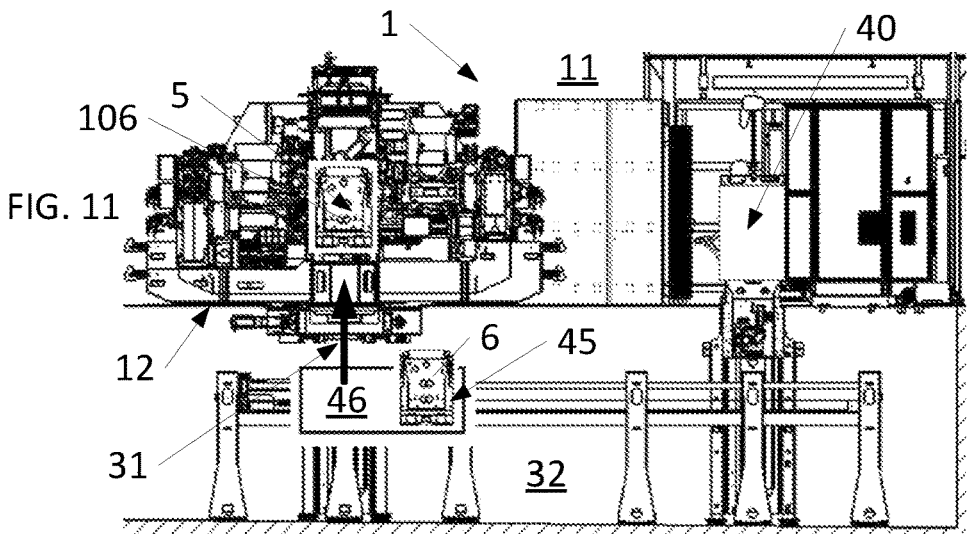
FIG. 11 illustrates a side view of the rise of the second tool module in the first lift cage, through the floor, from the conveyor of the basement to the core site, and the installation of the second tool module in the core site, replacing the first tool module, with a view to a second production cycle.

The said underground-transfer device 30 is then designed to be able to put alternately the first receptacle 45 and the second receptacle 46 facing the first lift cage 31, as can be seen in FIGS. 9 and 10, so as to be able to carry out a replacement operation during which the underground-transfer device 30 accommodates in the first receptacle 45, via the first lift cage 31, a used first tool block 6 coming from the core site 5 (FIG. 9), and then transfers, via the said first lift cage 31, a new second tool block 106 from the second receptacle 46 to the core site 5, as a replacement for the first tool block 6 (FIG. 11).

"New" means that the second tool module 106 has been suitably prepared, cleaned and configured beforehand, in the present case at the preparation site 40, such that it is ready to be introduced at the core site 5 to be used in order to produce a profiled element 2.

Advantageously, the use of two receptacles 45, 46 able to be placed alternately one after the other at the foot of the first lift mast 33, vertically in line with the first lift cage 31 (that is to say in the area corresponding to the vertical projection of the volume of the first lift cage 31 in a horizontal plane), makes it possible to very rapidly replace the used first tool module 6, following a first production cycle for a first profiled element 2, with a new second tool module 106 intended for the next production cycle of another profiled element 2.

As can be seen in FIGS. 4 to 15, the first and second receptacles 45, 46 are transported by the conveyor 42, preferably along a rectilinear horizontal transfer rail 44, so as to be able to come and go, in the basement 32, from the first lift cage 31, which here serves the core site 5, to the second lift cage 41, which here serves the preparation site 40, and vice versa, from the second lift cage 41 to the first lift cage 31.

The first and second receptacles 45, 46 could possibly form two carriages that are independent of one another and are each able to be displaced independently of the other along the transfer rail 44. However, for greater simplicity of the conveyor 42 and the facility 1, the two receptacles 4, 46 could be combined in one and the same convoy borne by the transfer rail 44.

Furthermore, to ensure the closing and clamping of the first and second head modules 3, 103 on the tool module 6, the facility 1 will preferably comprise, as illustrated in FIGS. 14, 15 and 16, first jaws 50 and second jaws 51 that are mounted so as to be able to move in translation along the second horizontal direction Y perpendicular to the coupling direction X.

The branches of these jaws 50, 51 are provided with ramps 52, which engage against mating ramps 53 provided in the head modules 3, 103, such that the mutual coming together of the first and the second jaws 50, 51 along the second horizontal direction Y forces, by way of the wedge effect, the mutual coming together of the first head module 3 and the second head module 103 along the coupling direction X, on either side of the core site 5, and thus causes the tool module 6 to be clamped between the said head modules 3, 103, as can be seen in FIGS. 15 and 16.

Advantageously, it will be noted that the facility 1 as a result exhibits excellent compactness in definitive terms and optimizes the space it occupies in that it utilizes, for different functionalities, the six directions of space under consideration around the core site 5 in accordance with an orthogonal system of axes centred on the core site 5, specifically, at the working level 11: the extrusion of the profiled element via the upper horizontal face of the core site 5, the bringing and removal of the tool module 6 via the lower horizontal face, the application of the head modules 3, 103 bearing the extruders via the lateral faces normal to the coupling direction X, the movements of the jaws 50, 51 opposite the frontal faces normal to the second horizontal direction Y; and, in the basement 32: transfer of the tool block 6 to and from the preparation site 40 along this same second horizontal direction Y; whilst still making all the useful stations P1, P2, P3, P4 directly accessible to an operator on one and the same working level 11.

It will be noted that the facility 1 may possibly comprise an elevated platform 60, at an elevation greater than the elevation of the floor 12, typically at an elevation of between 1.40 m and 1.80 m above the floor 12, which elevated platform 60 is accessed by way of a staircase and will make it possible to access the upper face of the discharge belt 13, which upper face of the discharge belt 13 will be located at human height, and more preferably at a height of between 40 cm and 1.20 m, for an operator who is standing on the said elevated platform 60. In this case, this is preferably the only elevated station of the facility 1.

A method for replacing a tool module 6, 106 according to the invention will now be briefly described in conjunction with FIGS. 6 to 13.

At least some, and preferably all, of the steps below could advantageously be managed by a suitable command unit, and preferably carried out automatically.

Initially (FIG. 6), a first tool module 6 is located in production, at the core site 5, while a second tool module 106, ready to be sent to production, waits at the preparation site 40 where the said second tool module 106 has been cleaned and/or assembled beforehand by an operator, who is at the preparation station P4 to do this. The facility 1 is in the closed configuration, as illustrated in FIGS. 1, 2 and 3.

At the end of a production cycle, the operator, who in principle is at the core station P1, interrupts the production and triggers the replacement.

The jaws 50, 51 are maneuvered backwards to unlock the head modules 3, 103, which move away from the core site 5 so as to be positioned in the open configuration and thus release the first tool module 6, as illustrated in FIG. 4.

At the level of the second lift cage 41, the second lift mast 43 lowers the second head module 106 through the floor 12 (FIG. 7), from the preparation site 40 to the second receptacle 46 which was waiting on the conveyor 42, vertically in line with the preparation station 40.

Figures 6, 7, 8:
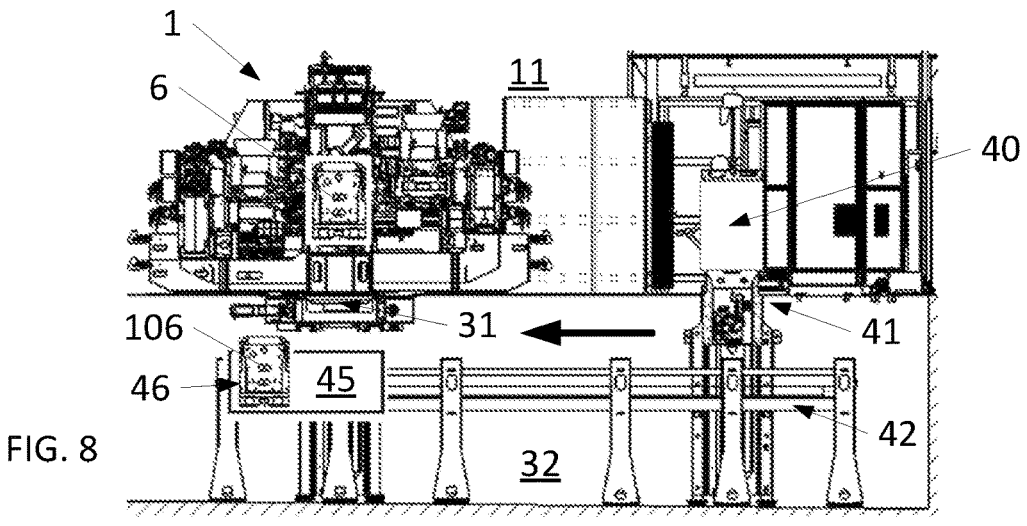
FIG. 6 illustrates a sectional side view, showing the working level and the basement, of the facility of FIGS. 1 to 5 with a first tool module engaged in the core site for a first production cycle, and a second tool module cleaned and prepared in a remote preparation site located at the working level.
FIG. 7 illustrates, in the same side view as FIG. 6, the lowering into the basement of the second tool module, from the preparation site to the core site, by way of a second lift cage provided in the floor, and the reception of the second tool module, vertically in line with the preparation site, on a conveyor of the transfer device that extends in the basement in order to connect the second lift cage to the first lift cage and comprises a first receptacle intended for the first tool module and a second receptacle which receives the second tool module.
FIG. 8 illustrates a side view of the displacement in the basement of the receptacles of the conveyor, which displacement makes it possible to bring together the second tool module and the first lift cage, and thus the core site, and to place the first receptacle of the conveyor in a waiting position below the first lift cage, vertically in line with the core site.

The convoy of the first and second receptacles 45, 46 is then displaced in the basement 32 along the conveyor 42 so as to leave the second lift cage 41 and reach the first lift cage 31, and position the first receptacle 45, which is empty, below the core site 5, vertically in line with the first lift mast 33 (FIG. 8). It will be noted that the operations of lowering the second tool module 106 onto the conveyor 42 and conveying the receptacles 45, 46, and thus the second tool module 106, towards the first lift cage 31 and placing them in a waiting state there could advantageously be performed in a parallel operation, while the production cycle implementing the first tool module 6 is running.

The first tool module 6 is then discharged, after use, from the core site 5 via the first lift mast 33, which lowers and retracts the said first tool module 6 through the floor 12, via the first lift cage 31, until the said worn first tool module 6 coming from the working level 11 is disposed in the first receptacle 45, which waits in the basement 32 (FIG. 9).

The conveyor 42 then moves the first receptacle 45 away to replace it, in the first lift cage 31, at the foot of the first lift mast 33, with the second receptacle 46 containing the new second tool module 106, for the core site 5 (FIG. 10).

The first lift mast 33 then raises the second tool module 106 in the first lift cage 31, through the floor 12 (FIG. 11), from the second receptacle 46 located in the basement 32, below the floor 12, until the second tool module 106 reaches the core site 5 located at the working level 11, above the floor 12.

Where appropriate, the operator (preferably the same operator, or possibly another operator) successively reaches, without leaving the floor 12 or changing elevation as a result, the maintenance stations P3, P3_103 to flush the extruders 4, 4_2, 4_3, 104, 104_2, 104_3 and clean the head modules 3, 103.

The operator then returns in principle to the core station P1 in order to trigger and monitor the closure of the head modules 3, 103 on the second tool module 106. They then initiate the new production cycle, where appropriate after moving to the feed stations P2 to check and/or reconfigure the feed of material to be extruded to the various extruders.

Figure 12:
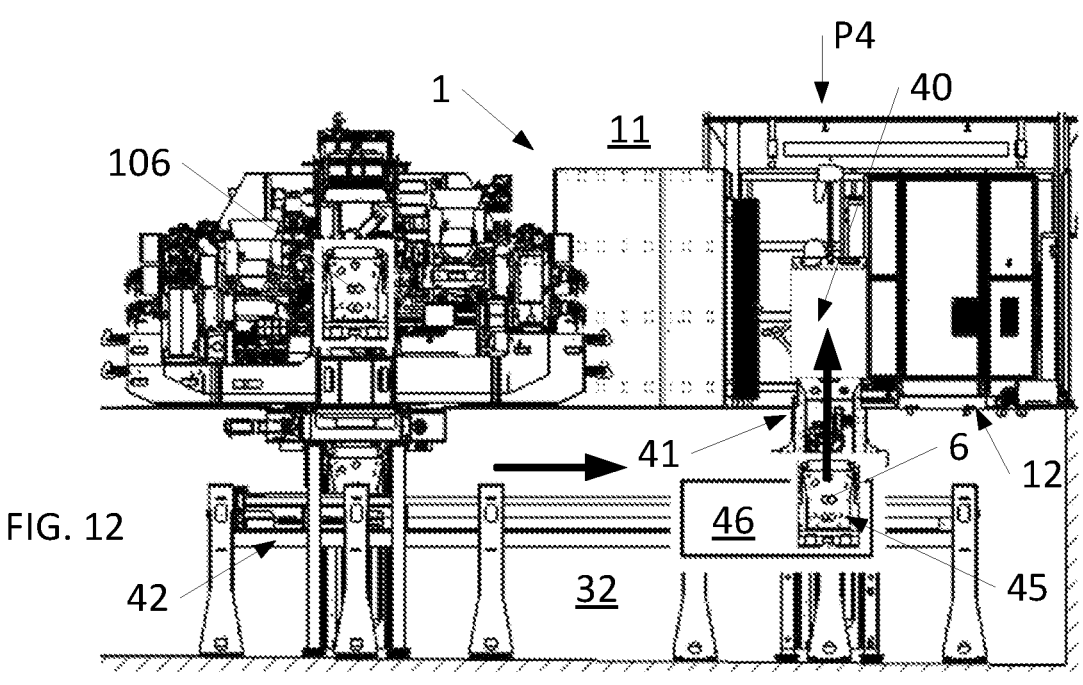
FIG. 12 illustrates a side view of the conveyance of the first tool module, on the conveyor in the basement, to the second lift cage, such that the first receptacle and thus the used first tool module it contains is placed below the said second lift cage, vertically in line with the preparation site.
Figure 13:
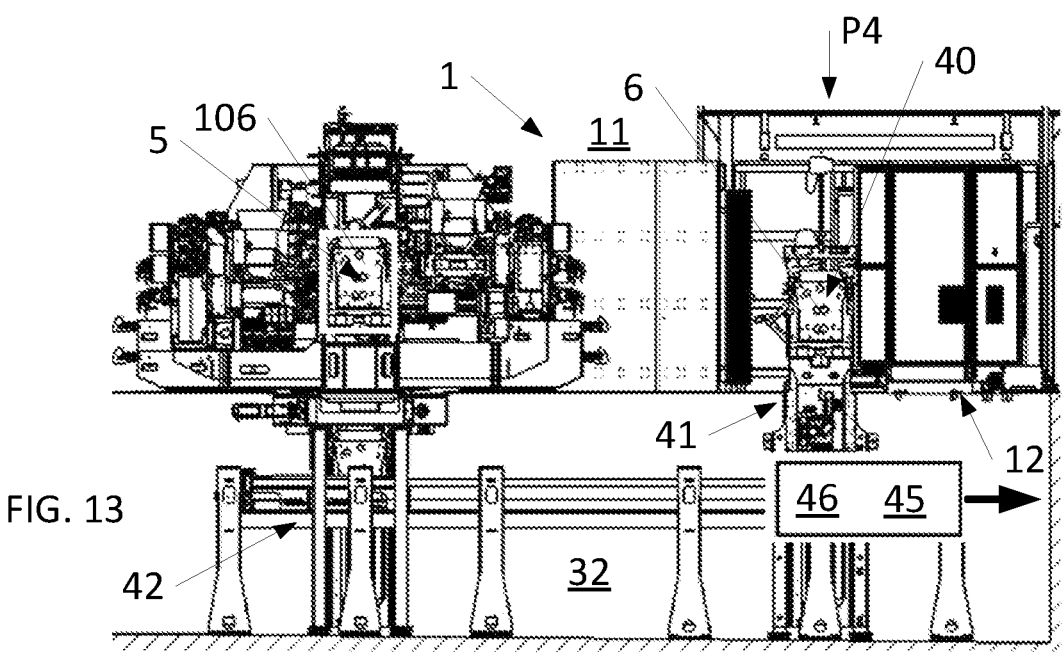
FIG. 13 illustrates a view from the side of the rise of the used first tool module from the conveyor of the basement to the preparation site, by way of the second lift cage, with a view to cleaning the said first tool module, and then the return of the second receptacle of the conveyor vertically beneath the second lift cage, with anticipation of the next change of the tool module.

During this time, or after the operator has triggered this new production cycle, the conveyor 42 returns the receptacles 45, 46 through the basement 32 to the second lift cage 41, and positions the first receptacle 45, containing the worn first tool module 6 coming from the core site 5, opposite the second lift mast 43, below the preparation site 40 (FIG. 12).

The second lift mast 43 then raises the first tool module 6 through the floor 12 (FIGS. 12 and 13), from the first receptacle 45, until the said first tool module 6 reaches the preparation site 40, where an operator (preferably the same operator, who to that end has moved to the preparation station P4 without having had to leave the floor 12) can clean and possibly reconfigure it, or even purely and simply replace it with a third tool module, while the second tool module 106 is in production.

Of course, the invention is in no way limited solely to the variants described in the foregoing, with persons skilled in the art being able notably to isolate the aforementioned features or combine them freely with one another, or to replace them with equivalents.

In particular, it is conceivable that the operator commands all or some of the commands for closing and opening the head modules 3, 103 from a station other than the core station P1.

The invention claimed is:

1. An extrusion facility intended to produce a profiled element, the extrusion facility comprising:

at least one first head module which bears at least one first extruder intended to supply a constituent material of the profiled element;

a core site configured to receive a tool module in order to enable connection of the at least one first extruder to the tool module in order to shape the profiled element, wherein the core site is located at a working level, which is provided with a floor on which an operator can move about to access the core site which is located above the floor; and an underground-transfer device which makes it possible to convey the tool module to the core site and/or, respectively, to remove the tool module from the core site, the underground-transfer device comprising at least one first lift cage which is designed to move the tool module through the floor from, or respectively to, a basement level, which is located below the floor of the working level.

2. The extrusion facility according to claim 1, further comprising a coupling device which makes it possible to displace the first head module on the floor of the working level, so as to alternately change the first head module between a closed configuration, in which the first head module is moved close to the core site so as to be pressed into contact with the tool module and to thus place the first extruder in communication with the tool module, and an open configuration, in which the first head module is moved away from the core site and thus from the tool module while remaining accessible to an operator who is on the floor, at the working level.

3. The extrusion facility according to claim 1, wherein the core site is located within an elevation range of between 0 cm and 200 cm above the floor of the working level.

4. The extrusion facility according to claim 1, further comprising a preparation site, which is separate and remote from the core site and is provided to enable preparation, including cleaning, of the tool module outside the core site, wherein the underground-transfer device is arranged so as to be able to convey the tool module, by moving through the floor via the first lift cage, from the preparation site to the core site, and vice versa, from the core site to the preparation site.

5. The extrusion facility according to claim 4, wherein the preparation site is located at the working level, above the floor, so as to be accessible to an operator moving about on the floor, and wherein the underground-transfer device comprises a second lift cage which is located at a distance from the first lift cage, is connected to the first lift cage by a conveyor located in the basement level, and is designed to move the tool module through the floor, from the preparation site located at the working level, above the floor, to the conveyor located in the basement level, below the floor, and vice versa, to move the tool module from the conveyor located in the basement level, below the floor, to the preparation site located above the floor.

6. The extrusion facility according to claim 5, wherein the underground-transfer device comprises a first receptacle able to receive a first tool block and a second receptacle able to receive a second tool block, wherein the underground-transfer device is designed to be able to put alternately the first receptacle and the second receptacle facing the first lift cage, so as to be able to carry out a replacement operation during which the underground-transfer device accommodates in the first receptacle, via the first lift cage, a used first tool block coming from the core site, and then transfers, via the first lift cage, a new second tool block from the second receptacle to the core site, as a replacement for the used first tool block, and wherein the first and second receptacles are transported by the conveyor so as to be able to come and go, in the basement level, from the first lift cage to the second lift cage, and vice versa.

7. The extrusion facility according to claim 5, further comprising:

a roller which is mounted so as to be able to rotate above the core site, vertically in line with the first lift cage, such that when the tool module is located at the core site, the tool module interacts with the roller to form a gap for shaping the profiled element; and at the working level, a second head module bearing at least one second extruder, wherein the first and the second head module are mounted so as to be able to move on the floor along a horizontal coupling direction, oppositely to one another, on either side of the core site so as to be able to alternately adopt an open configuration, in which the first and second head modules are each moved away from the core site along the horizontal coupling direction, so as to allow the underground-transfer device to engage the tool module in the core site and/or to remove the tool module from the core site, and a closed configuration, in which the first and second head modules are moved close to one another along the horizontal coupling direction, so as to be held pressed against the tool module located at the core site, on either side of the tool module along the horizontal coupling direction, to place the first extruder and the second extruder in communication with the tool module, wherein the first lift cage is located below the core site, vertically in line with the core site and the roller, wherein the second lift cage is located below the preparation site vertically in line with the preparation site, wherein the preparation site and the corresponding second lift cage are offset in relation to the core site and to the first lift cage along a second horizontal direction which is transverse to the coupling direction, and along which is oriented the conveyor positioned in the basement level, and wherein the floor extends along a horizontal plane which is large enough to allow the operator standing on the floor to access by turns, without leaving the working level, the core site, the preparation site, and the first and second head modules both when the first and second head modules are in the closed configuration and when the first and second head modules are in the open configuration.

8. The extrusion facility according to claim 7, wherein the tool module comprises an assembly of parallel plates stacked against one another in the direction of thickness along the horizontal coupling direction.

9. The extrusion facility according to claim 1, wherein the underground-transfer device comprises a first receptacle able to receive a first tool block and a second receptacle able to receive a second tool block, and wherein the underground-transfer device is designed to be able to put alternately the first receptacle and the second receptacle facing the first lift cage, so as to be able to carry out a replacement operation during which the underground-transfer device accommodates in the first receptacle, via the first lift cage, a used first tool block coming from the core site, and then transfers, via the first lift cage, a new second tool block from the second receptacle to the core site, as a replacement for the used first tool block.

10. The extrusion facility according to claim 1, further comprising a roller which is mounted so as to be able to rotate above the core site, vertically in line with the first lift cage, such that when the tool module is located at the core site, the tool module interacts with the roller to form a gap for shaping the profiled element.

11. The extrusion facility according to claim 1, wherein a free height of the working level above the floor is equal to or greater than 2.00 m, and wherein a free height in the basement level is equal to or greater than 1.90 m.

\* \* \* \* \*